Feb. 23, 1943.        A. POTDEVIN        2,311,692
TRIMMING MECHANISM
Original Filed Jan. 17, 1940
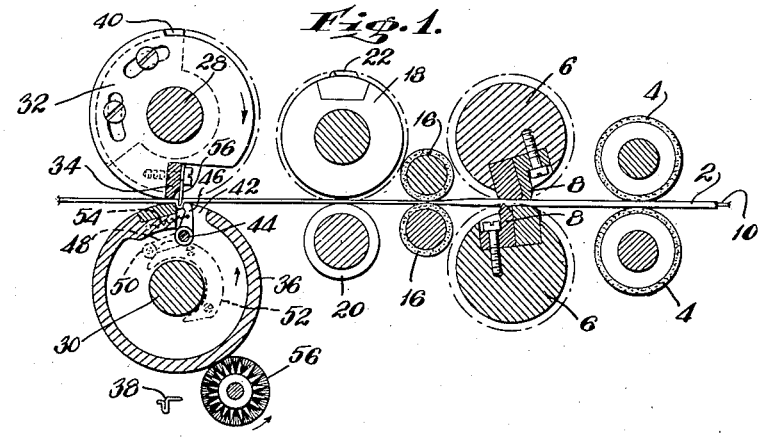
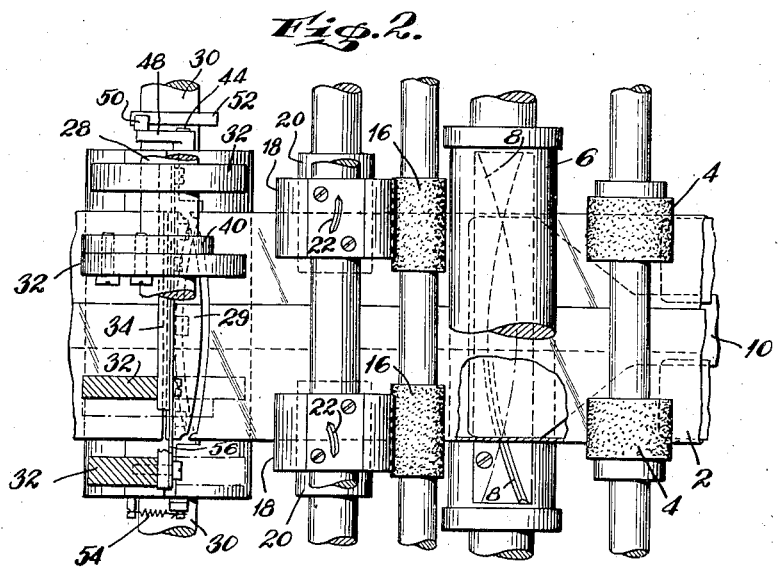
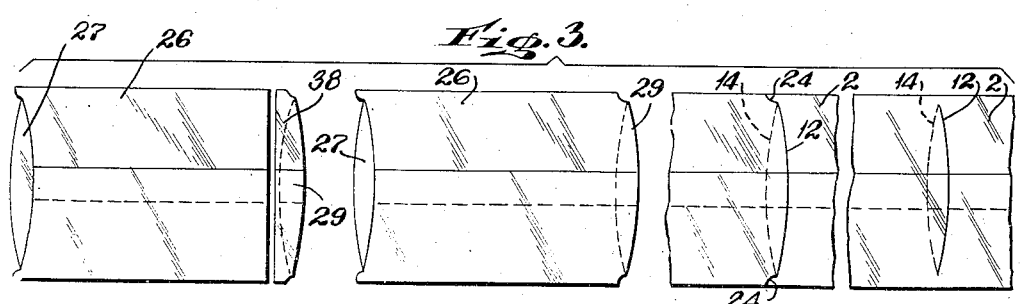
INVENTOR
Adolph Potdevin
BY
Liddle Buell and Montgomery
ATTORNEYS Patented Feb. 23, 1943

2,311,692

UNITED STATES PATENT OFFICE 2,311,692

TRIMMING MECHANISM

Adolph Potdevin, Garden City, N. Y., assignor to Potdevin Machine Company, Brooklyn, N. Y., a corporation of New York Original application January 17, 1940, Serial No. 314,222. Divided and this application December 23, 1941, Serial No. 424,134

7 Claims. (Cl. 164—61)

This invention relates to trimming mechanism for bag making machines wherein bag lengths are continuously and successively fed through the machine, one of the objects of the invention being the provision of trimming mechanism wherein and whereby the trailing end of each bag length will be trimmed and the trimming removed from the machine.

This application is a division of my copending application Serial No. 314,222, filed January 17, 1940.

Fig. 1 is a sectional elevational view of part of a bag making machine in which my improved trimming mechanism is incorporated;

Fig. 2 is a plan view of Fig. 1; and

Fig. 3 shows in plan for clarity of description the several steps which may be involved in the division of tubing into bag lengths and trimming of the bag lengths.

Referring to the drawing in detail: The bag making material, cellulose acetate, cellulose hydrate and the like, may be taken continuously from any suitable supply source and moved forward into the machine and as it advances it is formed into a continuous tube. The tubed material, designated 2, continuously advances between a pair of forwarding rollers 4 and from thence to a pair of rollers 6. Each of these rollers 6 carries a knife 8 which cooperates with a plate 10 slidably carried by a former plate. The function of the members 8 and 10 is partially to divide the tubing transversely into bag lengths as shown at 12 and 14 in Fig. 3.

During the operation of the members 8 and 10 the leading end of the tubing extends between rollers 16.

As the tubing advances beyond the rollers 16 it passes between rollers 18 and 20, the former carrying cutters 22 while the latter are smooth faced. The machine is so timed that when the perforated areas of the tubing reach a position between the rollers 18 and 20, the cutters 22 will have rotated to operative position to cut through the tubing 2 at the edges, as shown at 24 in Fig. 3, thereby completing the severing or dividing operation. A bag length as thus produced is shown in Fig. 3 where it has been designated 26.

This method of forming a bag length is merely illustrative as will be understood.

In the bag length thus formed a projecting lip is provided at each end of the bag length, the lip at the leading end being designated 27, the lip at the trailing end being designated 29. The lip 27 is used later as a pasting lip in bottoming the bag, but it is my desire to trim the trailing end of the bag length so that it is square across the end. Accordingly I provide upper and lower driven shafts 28 and 30 beyond the rollers 18 and 20.

The shaft 28 carries spaced discs 32 which in turn carry a trimmer plate or knife 34 projecting from the periphery thereof.

This trimmer knife 34 cooperates with the surface of an anvil cylinder 36 which is carried by the shaft 30 to cut off or trim the trailing end of each bag length as it comes through the machine. In Fig. 3, at the left, I show the piece 38 severed or trimmed from the bag length.

The discs 32 are adjustably secured to a disc or discs 40 on the shaft 28 so as to permit a circumferential adjustment of the trimmer knife relatively to shaft 28.

Means are provided for positively discharging the trimming 38 from the machine. As will be seen the periphery of the anvil cylinder 36 is provided with longitudinal slot 42. Within the cylinder below the slot 42 is a rod 44 carrying gripper jaw 46. One end of the rod 44 carries an arm 48 provided with cam follower roller 50 which cooperates with fixed cam 52.

The cam 52 is set so that with the parts in the position shown in Fig. 1 the gripper 46 will be closed by a spring 54. On rotation of the cylinder through an angle of about 180° the gripper jaw will be opened by the cam.

The discs 32 carry a tucker plate 56 which trails the trimming knife 34, this plate providing for tucking the trailing end of the bag length into position to be gripped by the gripper jaw 46 so that the trimming 38 will be gripped to the cylinder and be carried around with it for about a half turn of the cylinder 36, at which point the gripper opens leaving the trimming 38 free to fall away by gravity.

To effect positive discharge of the trimmings from the machine, a driven rotary brush 56 is provided adjacent the bottom of the periphery of the anvil cylinder 36. This brush is rotated oppositely to and in contact with the cylinder and will brush the trimmings out of the opened gripper as will be apparent.

It is to be understood that changes may be made in the details of construction and arrangement of parts within the purview of my invention.

What I claim is:

1. Trimming mechanism for bag making machines, comprising in combination a rotary trimming cutter, a cooperating rotary anvil cylinder, and rotary grippers rotating with the anvil cylinder for gripping the end of a bag length to be trimmed off by said cutter and for carrying this piece away from the trimming station.

2. Trimming mechanism for bag making machines, comprising in combination a rotatable shaft, discs secured thereto in spaced relation, trimmer discs with a trimmer blade projecting from the periphery thereof secured to the first mentioned discs, a cooperating smooth faced anvil cylinder cooperating with said trimmer blade so that when a bag length passes between the trimmer blade and anvil cylinder the bag length will be trimmed with a pinch cut, and a slot and stud connection between the trimmer discs and the first mentioned discs to provide for circumferential adjustment of the trimmer discs thereby to vary the timing of the trimming action without varying the speed of the bag lengths.

3. Trimming mechanism for bag making machines, comprising in combination adjustable rotatable discs carrying a trimming cutter, a rotatable anvil cylinder cooperating with said cutter, and grippers carried by the anvil cylinder for gripping the material to be trimmed from the bag lengths during the trimming operation and for carrying it away from the trimming station.

4. Trimming mechanism for bag making machines, comprising in combination a plurality of rotatable discs carrying a trimmer blade, said discs being adjustable circumferentially to provide for varying the length of material trimmed from the end of the bag length and to accommodate the trimming mechanism to bag lengths of different sizes, a cooperating anvil cylinder, grippers carried thereby, and a plate carried by said discs for tucking the end of successive bag lengths between the jaws of said grippers preparatory to trimming.

5. Trimming mechanism for bag making machines, comprising in combination a rotatable trimmer blade, a cooperating anvil cylinder whereby when a bag length passes between the trimmer blade and cylinder the end of the bag length will be trimmed with a pinch cut, a slot in the periphery of the anvil cylinder into which the end of the bag length to be trimmed is tucked, and a gripper for gripping the tucked portion of the bag length to the anvil cylinder so that the tirmming from the bag length will be gripped to the anvil cylinder.

6. Trimming mechanism for bag making machines wherein bag lengths are advanced continuously and successively through the machine, said trimming mechanism comprising in combination a rotatable trimming knife and a cooperating rotary anvil cylinder in the path of the advancing bag length, said knife being so timed that as the trailing end of each bag length passes between the knife and cylinder a short length will be trimmed therefrom, and a gripper cooperating with the anvil cylinder for successively gripping the said trailing end of each bag length to the cylinder during the trimming operation, said gripper retaining the trimming secured to the cylinder so that upon continued rotation of the cylinder the trimming will be carried away from the trimming station.

7. Trimming mechanism for bag making machines wherein bag lengths are continuously and successively advanced through the machine, said trimming mechanism comprising in combination a rotatable trimming knife, a cooperating rotary anvil cylinder, a tucker blade trailing the trimming knife for tucking the trailing end of each bag length into a slot in said cylinder, a gripper at said slot, said mechanism being so timed that the gripper will close on the tucked trailing end of the bag length as the trimming knife functions to trim the bag length, and a cam for opening the gripper after the same has moved away from the trimming station.

ADOLPH POTDEVIN.